United States Patent [19]
Turner

[11] Patent Number: 5,915,418
[45] Date of Patent: Jun. 29, 1999

[54] CLOSURE FOR PIPES AND THE LIKE

[76] Inventor: Glennard Bruce Turner, 7075 Klondike Rd., Pensacola, Fla. 32526

[21] Appl. No.: 08/857,878

[22] Filed: May 16, 1997

[51] Int. Cl.[6] ...................................................... F16L 55/10
[52] U.S. Cl. ...................... 138/89; 138/96 R; 138/96 T; 220/796
[58] Field of Search ................................ 138/96 R, 96 T, 138/89; 220/796, DIG. 19; 215/316

[56] References Cited

U.S. PATENT DOCUMENTS

| | | | |
|---|---|---|---|
| 679,519 | 7/1901 | Smith | 137/232 |
| 694,638 | 3/1902 | Hart | 137/232 X |
| 1,371,669 | 3/1921 | Davis | 220/202 |
| 1,837,970 | 12/1931 | Jones | 137/232 X |
| 2,461,620 | 2/1949 | Wright | 215/311 X |
| 2,873,765 | 2/1959 | Gregory | 138/96 |
| 2,919,721 | 1/1960 | Isenberg | 138/96 R X |
| 3,065,767 | 11/1962 | Topf | 138/89 |
| 3,229,738 | 1/1966 | Bianchini | 145/29 |
| 3,557,986 | 1/1971 | Poole, Jr. | 220/202 X |
| 3,713,463 | 1/1973 | Bywater, Jr. | 138/89 |
| 3,807,457 | 4/1974 | Logsdon | 138/89 |
| 3,821,969 | 7/1974 | Sinko | 138/89 |
| 4,285,440 | 8/1981 | Adams | 220/202 |
| 4,335,756 | 6/1982 | Sharp et al. | 138/89 |
| 4,457,327 | 7/1984 | Pepper | 220/202 X |
| 4,549,337 | 10/1985 | Newell et al. | 29/527.4 |
| 4,716,875 | 1/1988 | Troncoso, Jr. | 123/469 |
| 4,773,572 | 9/1988 | Stull | 220/203.29 X |
| 5,374,121 | 12/1994 | Draenert | 366/242 |
| 5,555,994 | 9/1996 | Chen | 220/287 |
| 5,645,347 | 7/1997 | Draenert | 220/DIG. 19 X |
| 5,678,720 | 10/1997 | Van Melle | 220/287 |

OTHER PUBLICATIONS

"Plumbing and Mechanical" magazine, Aug., 1997, p. 105.

*Primary Examiner*—Patrick Brinson
*Attorney, Agent, or Firm*—Harleston Law Firm; Kathleen M. Harleston

[57] ABSTRACT

A cap capable of being used to close off an unthreaded cylindrical member and capable of being removed after closing off the unthreaded cylindrical member is disclosed. This cap has a one-piece, generally circular, relatively flexible, relatively impervious, self-supporting body. It is made of elastomeric material, preferably rubber, and is shaped so as to include between about 2 and about 12 successive levels, each level having a larger diameter than the level before it. This multi-level cap is useful for capping water or sanitary systems during testing of the systems. The cap preferably has 3 levels which fit three different standard sized pipes, one pipe at a time.

2 Claims, 3 Drawing Sheets

CLOSURE FOR PIPES AND THE LIKE

BACKGROUND OF THE INVENTION

1. Technical Field

The present invention relates to a closure for unthreaded pipes and other unthreaded cylindrical members. More particularly, the present invention is a multi-level cap which is substantially comprised of elastomeric material and which can accommodate several different commercially available, standard sized pipes, one pipe at a time.

2. Background

Generally, the ends of threaded pipes can be closed by removable screw-on caps, and the ends of unthreaded pipes can be closed by removable plastic caps. For example, plastic caps can be used to close the ends of pipes or conduits which are to be buried underground long-term, such as the pipes or conduits used to protect telephone or electrical lines, or short-term, such as the overnight burial of a pipe in a trench as a safety or sanitary measure until work can begin the following work day.

Plastic caps can be used on the ends of unthreaded pipes as test caps. For example, when a residential or commercial building is under construction, a plumber (or other worker) will ordinarily lay in a system of pipes, cap off the ends of the pipes, then fill the system with water to test it for leaks. If there are no leaks, the pipes can be uncapped and the pipe lengths can be extended or the system can be otherwise completed. Test caps can be used on pipes in water or sewage treatment systems. Unfortunately, the plumber must carry a number of caps of all different standard-sizes (such as 2 inch, 4 inch and 6 inch caps) for the various standard pipe sizes he or she may encounter while testing a plumbing system. Currently, one cap fits only one size of pipe opening. These existing caps are called here "single" caps, versus the "multi-level" caps of the present invention. On a plumbing system for a residence, for example, a plumber could use about 12 to 15 single caps of several different sizes. On a larger project, such as a commercial building, hundreds of caps could be used for testing a system. Although these single caps are relatively inexpensive, it is troublesome to maintain an inventory of many different-sized single caps, and it can be a waste of expensive labor for work to halt while the correctly sized single cap is obtained.

The multi-level cap of the present invention resolves these problems. The multi-level cap is for use on one pipe opening at a time, but it will fit over any of several different sizes of pipe openings, depending upon the number and sizes of the levels in the cap. The plumber or other worker can grab one multi-level cap rather than having to hunt for the right sized single cap. For example, a tri-level cap of the present invention fits three different sized pipes and is therefore much more likely to fit the pipe in question. With the multi-level cap, the plumber can prevent inconvenient and aggravating work stoppages for trips to his or her truck or to the plumbing supply store to procure the right-size single cap. If the plumber has multi-level caps of the present invention available, he or she need not waste time stocking and handling many single caps of various sizes. The multi-level cap of the present invention also works well with a release valve in the top to release pressure which can build up in the plumbing system.

SUMMARY OF THE INVENTION

The present invention is a cap capable of being used to close off an unthreaded cylindrical member and capable of being removed after closing off the unthreaded cylindrical member. This cap is comprised of a one-piece, generally circular, relatively flexible, relatively impervious, self-supporting body. It is substantially comprised of elastomeric material and is shaped so as to include between about 2 and about 12 successive levels, each level having a larger diameter than the level before it.

BRIEF DESCRIPTION OF THE DRAWINGS

A more complete understanding of the invention and its advantages will be apparent from the following detailed description taken in conjunction with the accompanying drawings, wherein examples of the invention are shown, and wherein.

DESCRIPTION OF THE PREFERRED EMBODIMENTS

Figure 1:
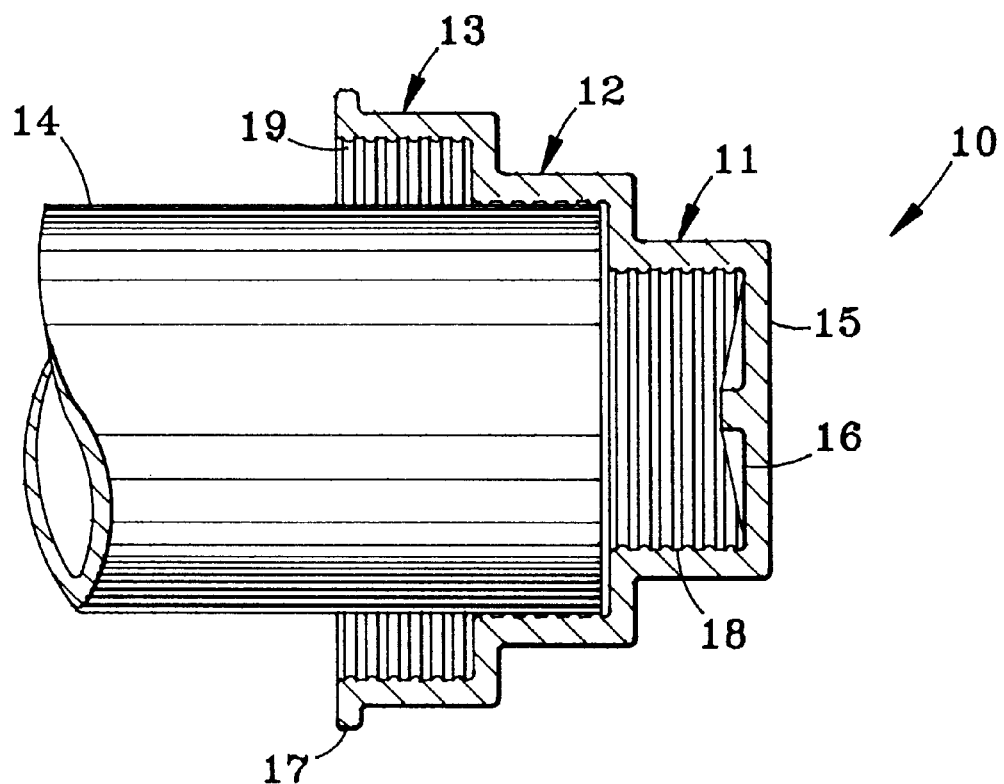
FIG. 1 shows a side view of a tri-level cap embodying a preferred form of the present invention, which is in use on the end of a pipe.

In the following description, like reference characters designate like or corresponding parts throughout the several views. Also, in the following description, it is to be understood that such terms as "right", "left", "inside", "outside", and the like are words of convenience and are not to be construed as limiting terms. Referring in more detail to the drawings, the invention will now be described.

FIG. 1 shows a cap embodying the teachings of the present invention and generally designated by the reference character 10. Caps of the present invention have different levels which are assigned different size numbers commensurate with the standard sizes of the pipes each level fits. For example, if a cap 10 has a level which fits a 2 inch pipe, it is called a 2 inch cap level. Each level is assigned a size. The size corresponds loosely to the actual size of the level, although the cap diameter is generally slightly larger than the pipe diameter to allow for a close fit around the outside of the pipe.

With reference to FIG. 1, three levels are shown in cap 10: a smaller first level 11 at the top of the cap, a second, medium-sized level 12 in the middle, and a larger third level 13 at the bottom of the cap. The bottom of the cap is the open end through which the pipe fits. In the embodiment shown in FIG. 1, the middle level 12 is of the proper size to fit the pipe 14. The first level 11 would fit a smaller pipe and the third level 13 would fit a larger pipe. A tri-level cap 10 could fit, for example, a 2 inch, 4 inch, or 6 inch pipe at the first 11, second 12 or third 13 level of the cap, respectively.

At the top of the cap 10 in FIG. 1 is outside top wall 15. Inside the cap 10, the top wall 16 is thickened to withstand pressure which can build up inside the plumbing system. Inside top wall 16 has a gradual slope which builds toward the center of the top. The slope should be such that it does not interfere with snug closure of the cap 10 around the pipe 14 at the first level 11 of the cap, yet it should be sufficient to increase resistance in the cap to pressure. This thickening in the inside of the top of the cap works particularly well in the multi-level cap 10, which often has an unoccupied first level, versus a conventional single cap. The extra space between the end of the pipe and the top of the multi-level cap 10 can be advantageous.

At the bottom, outer edge of cap 10 is a lip 17. The inner side walls 18 of the cap 10 of FIG. 1 have ridges 19. Ridges 19 are preferably present in an amount sufficient to provide friction between the inner side wall 18 of the cap 10 and the pipe 14. The ridges 19 help hold the cap 10 in place on the pipe 14, even under pressure. The contents of plumbing systems can generate gases or liquids and pressure can build up within the system. The preferred ridges 19 are concentric circles, similar to stacked hula-hoops, which are part of and project slightly from the inside wall of the cap level. Preferably, though, the smaller size levels, e.g. those with diameters 4 inches and under, have a relatively smooth inside wall 18. The larger size levels, e.g. those with diameters more than 4 inches, preferably have ridges on the inner side walls. Preferably, each level with ridges 19 has between about 3 and 15, more preferably between about 4 and 8, ridges per level.

The levels of the cap, which could also be called steps, of the cap 10 preferably have rounded outside corners for easier removal from a mold during manufacture of the cap 10. The sides of each level are preferably tapered, sloping outward toward the bottom of the level on the outside of the cap 10. This taper facilitates removal of the cap 10 from a mold, and application of the cap 10 on a pipe 14, particularly a pipe which has imperfections or is slightly out of round. The preferred degree of taper on the outside walls is between about 2 and about 10, more preferably 5, degrees between the top of each level and the bottom of the level.

Figure 2:
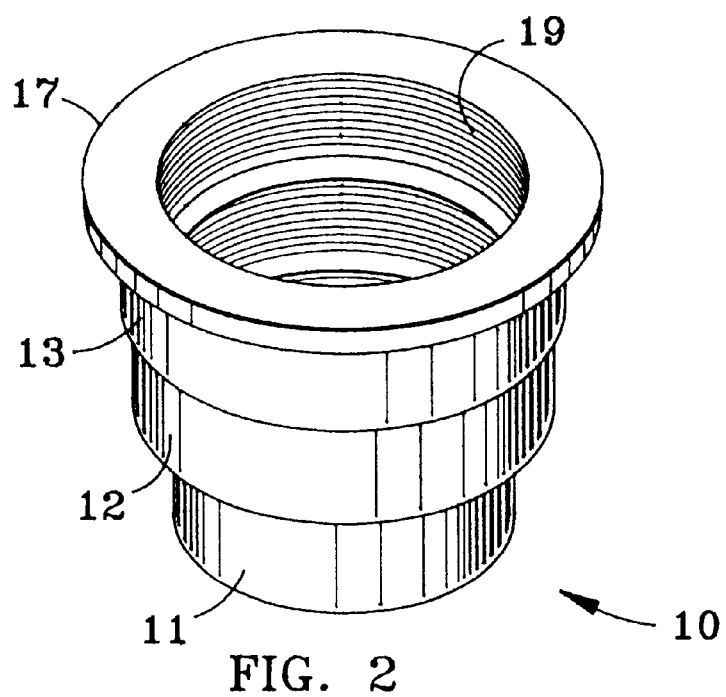
FIG. 2 shows a perspective view of a tri-level cap embodying a preferred form of the present invention, and illustrating a portion of the inside of the cap.

FIG. 2 shows a perspective view of a tri-level cap cap embodying a preferred form of the present invention, and illustrating a portion of the inside of the cap. The cap 10 has been upended and a portion of the inside of the cap can be seen. It has three levels, each level having a larger diameter than the level before it. The first level 11 is at the top of the cap 10 and the third, largest level 13 is at the bottom of the cap 10. The cap 10 of FIG. 2 has a lip 17, and inner side walls 18 with ridges 19.

Figure 3:
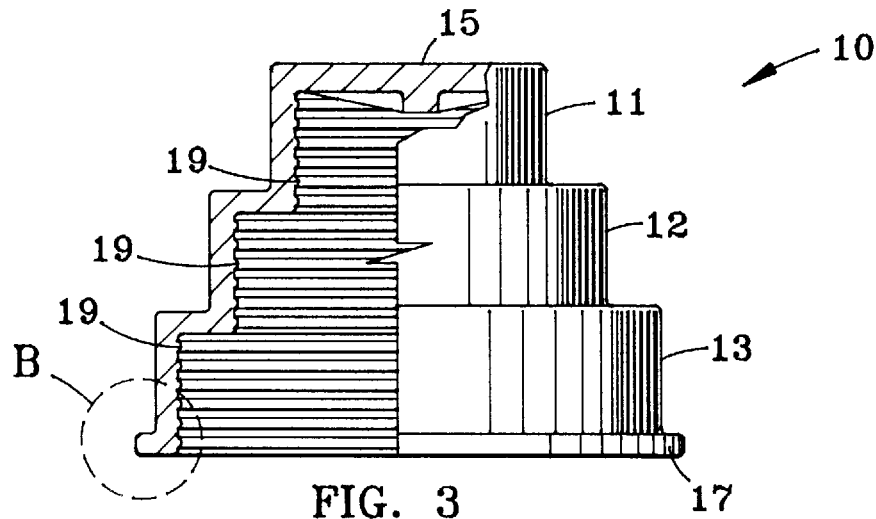
FIG. 3 shows a split side view of a tri-level cap, partly in section, which is constructed in accordance with the present invention.

FIG. 3 shows a split side view of a tri-level cap which is constructed in accordance with the present invention. The right side of the figure shows the outside of the cap 10 and the left side is in section. The first level 11 is at the top of the cap 10 and the third, largest level 13 is at the bottom of the cap 10. The outside top wall 15 is shown. The inner side walls 18 of each level have the preferred ridges 19.

Figure 4:
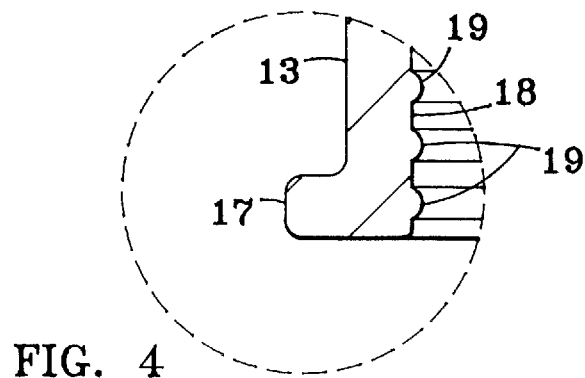
FIG. 4 shows an enlarged, supplementary view of the portion of the cap indicated in FIG. 3 as "B"

FIG. 4 shows an enlarged, supplementary view of the portion of the cap indicated in FIG. 3 as "B". This view shows details of the inside and outside of the first level 13 of the cap 10. The lip 17, inner side wall 18, and three ridges 19 are shown. This first level 13 has six ridges 19 along the inner side wall 18.

Figure 5:
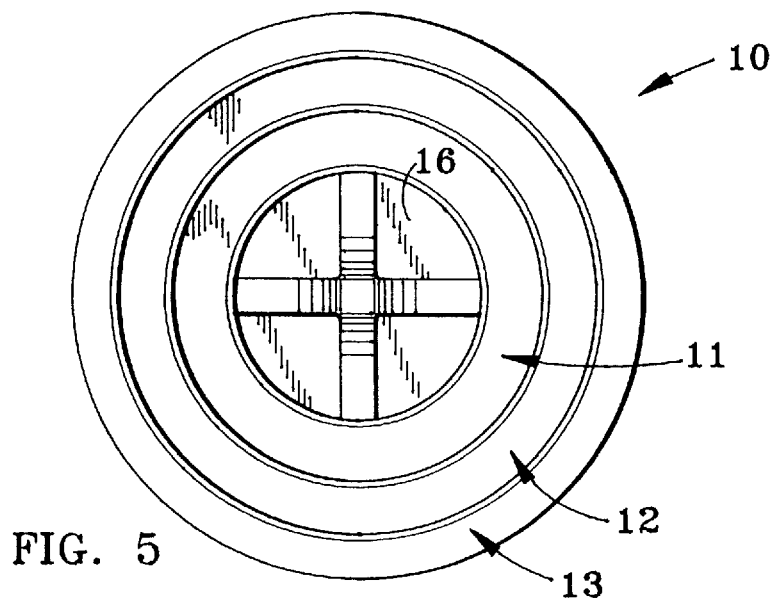
FIG. 5 is an end view of the cap shown in FIG. 3, taken from the bottom of the cap.

FIG. 5 is an end view of the cap shown in FIG. 3, taken from the bottom of the cap. The first to third levels are shown as 11–13. In FIG. 5, the third, largest level 13, is outermost. In the center of FIG. 5 is the inside top of the cap 10. This cap 10, rather than having a general thickening on the inside of the top wall 16, has a thickening of the inside top wall 16 in the shape of a cross. This thickening serves to strengthen the cap so it can withstand the pressure which normally builds in the pipes.

Figure 6:
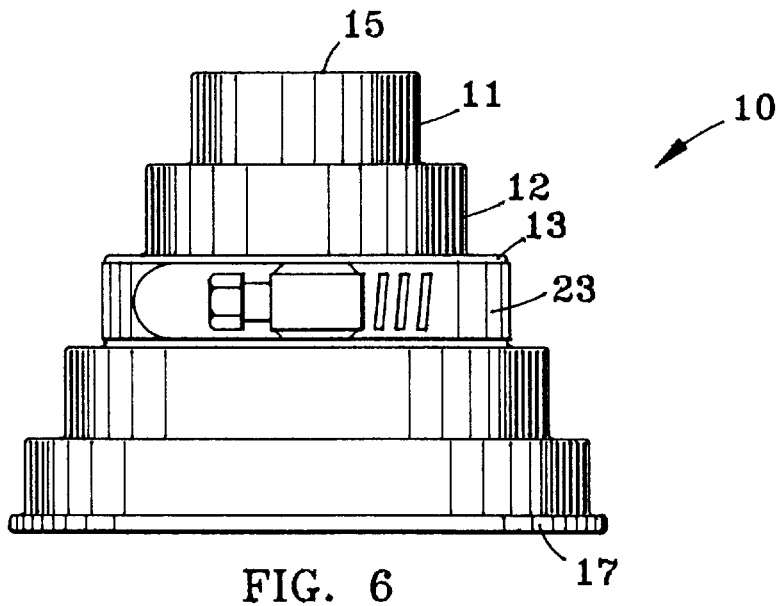
FIG. 6 shows a side view of another embodiment of a cap constructed in accordance with the present invention, and having five levels.

FIG. 6 shows a side view of another embodiment of a cap 10 constructed in accordance with the present invention. This cap 10 has five levels, and can thus accommodate one of five standard sizes of pipe 14. A worm drive clamp 23 is shown around the third level 13. This commercially available, expandable, worm drive clamp 23 is similar to a belt used for clothing in that it can be tightened at different settings, depending on which level of the cap 10 it is around. Only one clamp 23 would be needed for one multi-level cap 10. If the cap 10 fit a particular pipe at the third cap level 13, for example, the worm drive clamp 23 would be tightened around the periphery of the cap 10 at the third level 13 once the cap has been placed on the end of the pipe 14. The clamp 23 would be set at a tighter setting if it is placed around the first level 11, and so forth.

Figure 7:
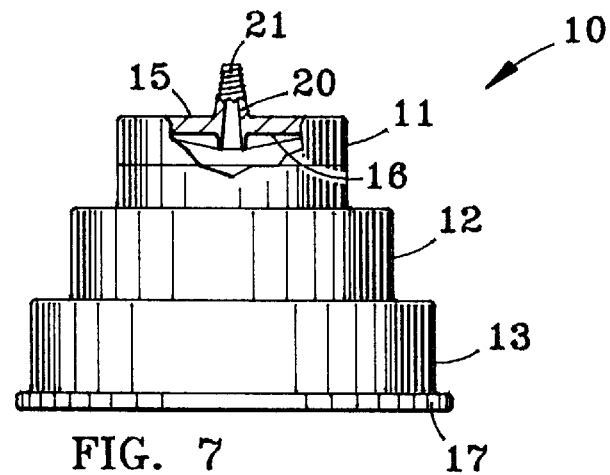
FIG. 7 shows a side view of a tri-level cap embodying a preferred form of the present invention, and illustrating a valve at the top of the cap.

FIG. 7 shows a side view of a preferred embodiment of a tri-level cap 10 constructed in accordance with the present invention. The view is partly broken away at the top to show the valve 20 which extends outwardly from and down through the top of the cap 10. The valve 20 has been molded into the top wall 15 of this cap 10. The valve 20 extends through to the inside top wall 16, and can be used to release pressure from the plumbing system. Generally, once the pressure in the pipe 14 has been released through the valve 20, the multi-level cap is easier to remove from the pipe. The valve should be of a type which is made for releasing gas and/or liquid from inside the pipe, depending on the type of plumbing system involved (e.g. water or sewage treatment system). The valve 20 has a threaded ending 21 at the top, which can accommodate a screw-on valve cap (not shown). The valve cap keeps the aperture closed and clean when the valve 20 is not in use.

When the second 12 or third 13 level of the cap 10 is occupied by the pipe 14, it can be seen from FIGS. 1 and 7 that there is additional space provided inside the cap 10 between the end of the pipe 14 and the inside top wall 16 of the cap 10.

Figure 8:
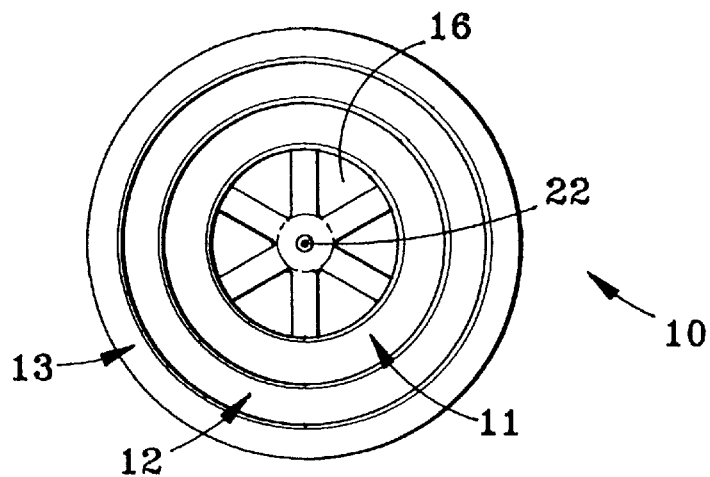
FIG. 8 is an end view of the cap shown in FIG. 7, taken from the open, bottom end of the cap.

FIG. 8 is an end view of the cap shown in FIG. 7, taken from the bottom of the cap. The first to third levels are shown as 11 through 13. Rather than a cross-shape as in FIG. 5, the thickened inside top wall 15 in FIG. 8 has six bars which radiate outward from the center. The center aperture 22 is at the bottom of the valve 20. Oftentimes, gas (or liquid) will build up inside the pipe. When the valve is opened, the gas or liquid will move through the aperture 22 in the valve 20 from the inside of the cap 10 to the outside.

In general, this is a cap 10 capable of being used to close off an unthreaded cylindrical member, preferably a pipe 14, and capable of being removed after closing off the unthreaded cylindrical member. This removable cap is comprised of: a one-piece, generally circular, relatively flexible, relatively impervious, self-supporting body. The cap 10 is substantially comprised of elastomeric material and is shaped so as to include between about 2 and about 12 successive levels, each level having a larger diameter than the level before it.

Caps of the present invention are substantially comprised of elastomeric material, preferably natural or synthetic rubber. Caps of the present invention are preferably made of materials selected from the group consisting of plastic, buta-nitrile, ethylene propylene diene material (EPDM), urethane, poly-urethane, red rubber, natural rubber, and a combination thereof. They are most preferably substantially comprised of ethylene propylene diene. The present caps are preferably molded as a one-piece body.

Caps of the present invention are preferably more than 70%, more preferably more than 80%, most preferably more than 95%, by weight, of natural and/or synthetic rubber. Most preferably, caps of the present invention are made entirely of natural and/or synthetic rubber. They are preferably of such a nature that they can be fitted closely on and conform to the end of the pipe, particularly when the pipe is not entirely concentric. They are also preferably of such a nature that they can withstand the pressures which may build up in water or sanitary systems.

Each cap level has an inside diameter which corresponds with the standard diameter of a commercially available, unthreaded pipe. The present multi-level caps preferably have inside diameters between about ½ inch and about 20 inches, more preferably between about 1 inch and about 10 inches, most preferably between about 1½ inches and about 8 inches. The levels of caps made according to the present invention preferably graduate from the smallest size on the top of the cap to the largest size on the bottom. The inside diameters of caps made according to the present invention are preferably selected from the group consisting of 1½, 2, 3, 4, 5, 6, and 8 inches. The most preferred tri-level cap has a 1½ inch first level, a 2 inch second level, and a 3 inch third level; or a 2 inch first level, a 4 inch second level, and a 6 inch third level.

The cap 10 preferably comprises between three and five levels. The inner side wall 18 of each level of the cap preferably comprises ridges 19 which extend around the inner side wall 18. The cap 10 preferably further comprises a pressure valve 20 which extends outwardly from the center of the top of the cap. The valve 20 allows for the release of gas or liquid from the inside of the cap to the outside. The cap 10 is preferably capable of being used as a test cap for water or sanitary piping systems. The inside top wall 16 of the cap 10 comprises a raised area in the shape of from about four to about ten bars which radiate outward from the center of the inside of the cap. The cap 10 preferably further comprises means for releasably securing the cap at the appropriate level around the edge of the open end of the unthreaded pipe, more preferably a clamp, most preferably an expandable worm drive clamp.

The walls of caps made according to the present invention vary in width. They are preferably between about 1/32 inch and about 3/8 inch in thickness. The present multi-level caps can preferably withstand pressures up to 10 pounds per square inch (psi).

The caps of the present invention are preferably reusable. Where they are used as test caps, for example, they can be removed from the end of the pipe and transported to the next job. There, they can be used on the same or a different sized pipe, depending on the sizes of the cap levels. They should not wear out as fast as a conventional single cap because they have multiple levels which can be used on various pipe sizes.

A cap of the present invention is preferably black. However, fluorescent colors, such as fluorescent orange, are also preferred for easy location in stock, on the job site, and once the cap is in place on the pipe.

From the foregoing it can be realized that the described caps of the present invention may be easily and conveniently utilized with a minimum of difficulty by plumbers, homeowners, and others. These multi-level caps are considered to answer a need in the industry for a relatively inexpensive, removable cap which can accommodate more than one size of pipe, thus reducing required cap inventories and minimizing the time spent searching for the correctly sized cap.

While preferred embodiments of the invention have been described using specific terms, this description is for illustrative purposes only. It will be apparent to those of ordinary skill in the art that various modifications may be made without departing from the spirit or scope of the invention, and that such modifications are intended to be within the scope of the present invention.

What is claimed is:

1. A removable, reusable test cap for water or sanitary piping systems, the cap being comprised of: a one-piece, generally circular, relatively flexible, relatively impervious, self-supporting body, a pressure release valve, and means for releasably securing the cap at the appropriate level around the edge of the open end of a pipe; the cap being substantially comprised of natural or synthetic rubber material and being shaped so as to include between 3 and 5 successive levels, each level having a larger diameter than the level before it; and wherein each level has an inside diameter which corresponds with the standard diameter of a commercially available, unthreaded pipe; and the inner side wall of each level of the cap comprises ridges which extend around the inner side wall; and wherein the pressure release valve extends outwardly from the center of the top of the cap, and allows for the release of gas or liquid from the inside to the outside; and wherein the inside top wall of the cap comprises a raised area.

2. A cap according to claim 1, wherein the cap is substantially comprised of ethylene propylene diene.

* * * * *